United States Patent [19]

Kobayashi et al.

[11] Patent Number: 5,082,042

[45] Date of Patent: Jan. 21, 1992

[54] BELT ARRANGEMENT FOR HIGH DURABLE PNEUMATIC RADIAL TIRE

[75] Inventors: Yasuhiko Kobayashi, Hachioji; Hiroyuki Koseki, Kodaira; Yumi Kawame, Sayama, all of Japan

[73] Assignee: Bridgestone Corporation, Tokyo, Japan

[21] Appl. No.: 581,153

[22] Filed: Sep. 10, 1990

Related U.S. Application Data

[63] Continuation of Ser. No. 284,367, Dec. 14, 1988, abandoned.

[30] Foreign Application Priority Data

Dec. 15, 1987 [JP] Japan .................. 62-315190

[51] Int. Cl.$^5$ .................................. B60C 9/28
[52] U.S. Cl. .......................... 152/535; 152/538
[58] Field of Search .................. 152/538, 535, 534

[56] References Cited

U.S. PATENT DOCUMENTS

| | | | |
|---|---|---|---|
| 3,690,364 | 9/1972 | Barassi et al. | 152/534 X |
| 3,874,436 | 4/1975 | Hashida | 152/535 |
| 4,865,103 | 9/1989 | Kobayashi et al. | 152/536 |

FOREIGN PATENT DOCUMENTS

| | | | |
|---|---|---|---|
| 59-118507 | 7/1984 | Japan | 152/534 |
| 63-38007 | 2/1988 | Japan | 152/535 |

Primary Examiner—Geoffrey L. Knable
Attorney, Agent, or Firm—Sughrue, Mion, Zinn, Macpeak & Seas

[57] ABSTRACT

A high durable pneumatic radial tire includes reinforcing belts of at least four cord layers whose cords are arranged in parallel with each other and coated with rubber. These cord layers are laminated about a crowd region of a radial carcass with the cords intersecting with each other over a crown circumference to reinforce a tread of the tire. The cord layers are divided into two groups of positive and negative signs by signs of inclined angles of projections of the cords of the respective cord layers onto an imaginary coordinate plane including a rotating axis of the tire. The cord layers in each of the groups are wider as they are arranged on further radially outer sides. The maximum width of the cord layers of the one group is much narrower than a maximum width of the cord layers of the other group. In this manner, shearing strains caused by load acting upon the tire in rubbers between the cord layers near to side ends of the cord layers in contact with a tread rubber on the reinforcing belts.

6 Claims, 6 Drawing Sheets

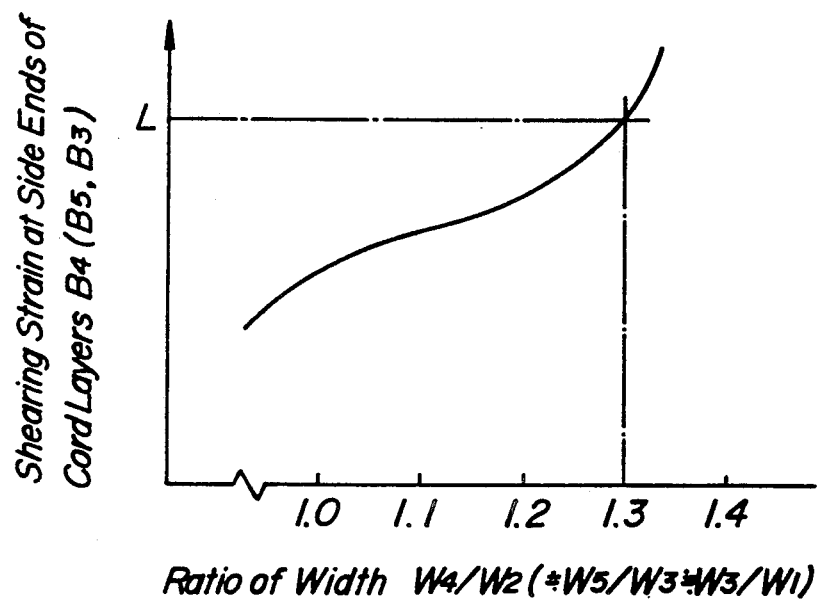
FIG_2

FIG_3a PRIOR ART
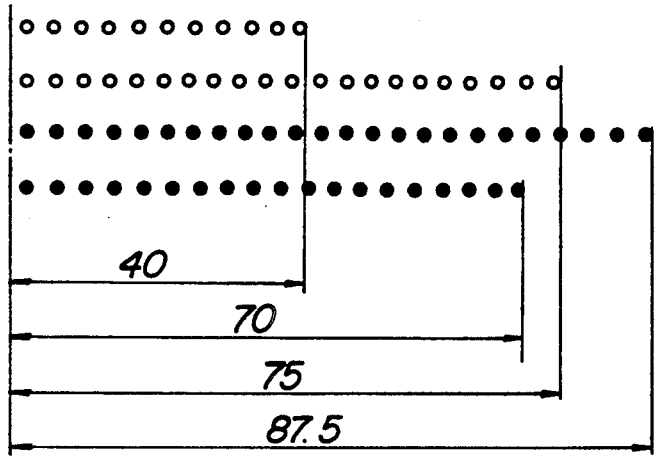
Tire No. 1
FIG_3b
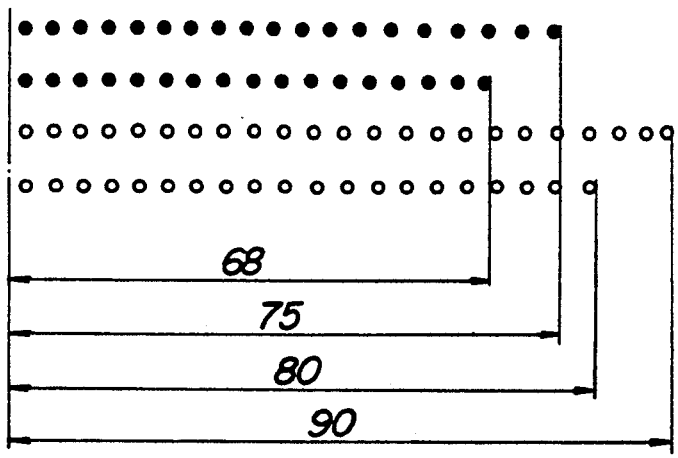
Tire No. 2
FIG_3c
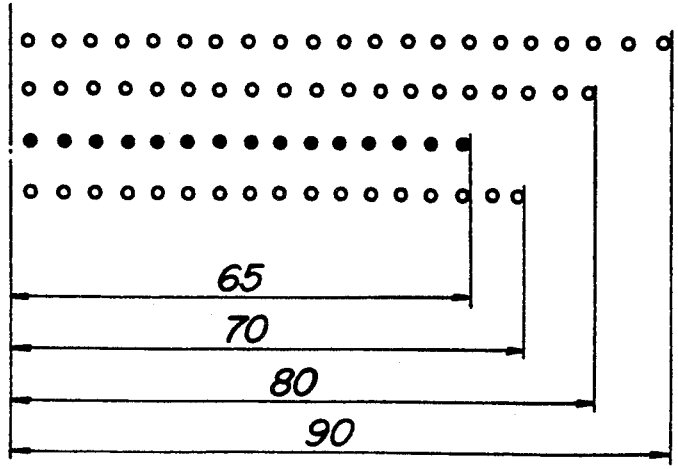
Tire No. 3

FIG_3d
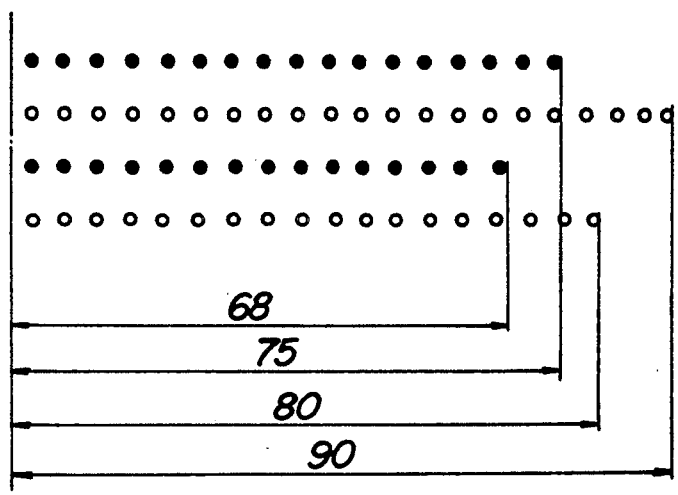
Tire No.4
FIG_3e
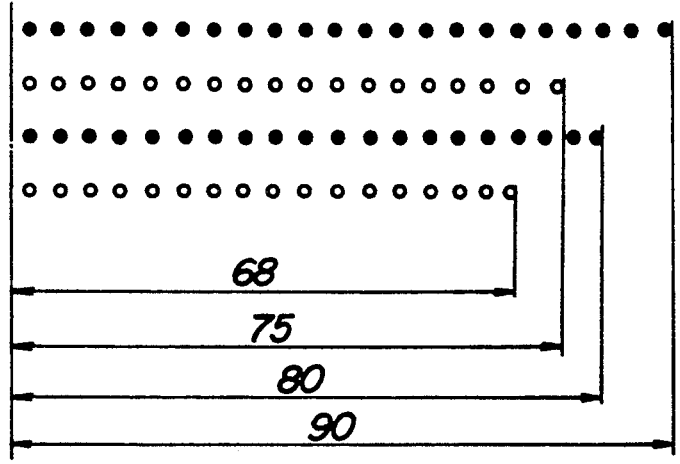
Tire No.5

BELT ARRANGEMENT FOR HIGH DURABLE PNEUMATIC RADIAL TIRE

This is a continuation of application Ser. No. 07/284,367 filed Dec. 14, 1988 now abandoned.

BACKGROUND OF THE INVENTION

This invention relates to a pneumatic radial tire. More particularly it relates to a pneumatic radial tire including laminated belts of at least four rubber coated cord layers arranged for reinforcing a tread about a crown region of a radial carcass to be able to effectively prevent separations liable to occur at belt ends so as to improve the durability, of the, tire without increasing diameter enlargement. The invention is advantageously applicable to heavy duty vehicles such as trucks and buses and ultraheavy duty vehicles such as construction and earth moving vehicles.

In general, a pneumatic radial tire includes a plurality of cord layers as reinforcing belts whose rubber coated cords are arranged in parallel with each other. The cord layers are arranged about a crown region of a radial carcass to be laminated so that the rubber coated cords intersect with each other over a crown circumference to reinforce the tread of the tire. With such a pneumatic radial tire, however, separation faults often occur in the proximity of width ends of the belts.

In order to overcome this problem, there have been many proposals with respect to cord inclined angles of belt layers, forms of belts, shapes and arrangements of cord layers and the like. Although satisfactory results have been obtained with relatively small tires, for example, pneumatic radial tires for passenger cars, separations apt to occur in the proximity of width ends of belts could not be sufficiently prevented with large tires. It probably results from the fact that a number of rubber coated cord layers are generally used for belts of large tires for trucks and buses or ultralarge tires for earth moving or construction vehicles.

The reinforcing of the tread of a pneumatic radial tire with the aid of belts serves to restrain the diameter enlargement caused by filling with inner pressure into the tire. If the restraint is insufficient, tensile strains occurring in a tread of the tire detrimentally affect wear-resistance and cut-resistance of the tread.

In order restrain the diameter enlargement, it is of course necessary to make small intersecting angles of cords of belts over a crown circumference of a carcass and simultaneously use large modulus cords.

On the other hand, tensile forces acting upon belts made of laminated cord layers having small cord angles cause the belts to deform so as to make smaller the intersecting angles of cords in the so-called "pantograph displacement". However, as side edges of the belts terminate in free ends of the cords, the side edges of the belts are displaced to a greater extent in comparison with centers of the belts. These displacements are opposite to each other according to directions of inclinations of the cords of the laminated cord layers.

Therefore, considerable shearing strains occur in the rubber embraced between adjacent cord layers with different cord inclined angles in the proximity of side ends of the belts under tensile forces of the belts. The shearing strains cause the separations at ends of the belts.

It has been therefore difficult to simultaneously accomplish the restraint of the diameter enlargement and the prevention of separation at belt ends.

SUMMARY OF THE INVENTION

It is a primary object of the invention to provide a high durable pneumatic radial tire which simultaneously accomplishes the restraint of the diameter enlargement and the prevention of separation at belt ends.

In order to achieve this object, in a high durable pneumatic radial tire including reinforcing belts of at least four cord layers whose cords are arranged in parallel with each other and coated with rubber. The cord layers are laminated about a crown region of a radial carcass with the cords intersecting with each other over a crown circumference to reinforce a tread. According to the invention the cord layers are divided into two groups of positive and negative signs by signs of inclined angles of projections of the cords of the respective cord layers onto an imaginary coordinate plane including a rotating axis of the tire, and the cord layers in each of the groups being wider as they are arranged on further radially outer sides. A maximum width of the cord layers of one group being much narrower than a maximum width of the cord layers of the other group, thereby reducing shearing strains caused by load acting upon the tire in rubbers between said cord layers near to side ends of the cord layers in contact with a tread rubber on the reinforcing belts.

It is preferable that a ratio of a width of a wider cord layer to a width of a narrower cord layer adjacent to said wider cord layer of each group is less than 1.3.

In a preferred embodiment of the invention, a ratio of the maximum width of the groups including wider and narrower cord layers, respectively, is within 0.7-0.9.

The cord layers of each of the groups preferably have larger inclined cord angles as they are arranged on further radially outer sides.

In another preferred embodiment of the invention, the cords of the cord layers have a physical property of breaking elongation less than 3.5%.

In order that the invention may be more clearly understood, preferred embodiments will be described, by way of example, with reference to the accompanying drawings.

BRIEF DESCRIPTION OF THE DRAWINGS

FIG. 1 is a sectional view of a part of a tire illustrating outline of an arrangement of belts according to the invention;

FIG. 1b is a sectional view of the cord layers taken along the line Ib—Ib in FIG. 1a;

FIG. 2 is a graph illustrating the effect of the invention;

FIG. 3a is a schematic view illustrating a conventional cord layer arrangement of a tire;

FIGS. 3b, 3c, 3d and 3e are schematic views showing cord layer arrangements of large tires according to the invention.

DESCRIPTION OF THE PREFERRED EMBODIMENTS

Figure 1A:
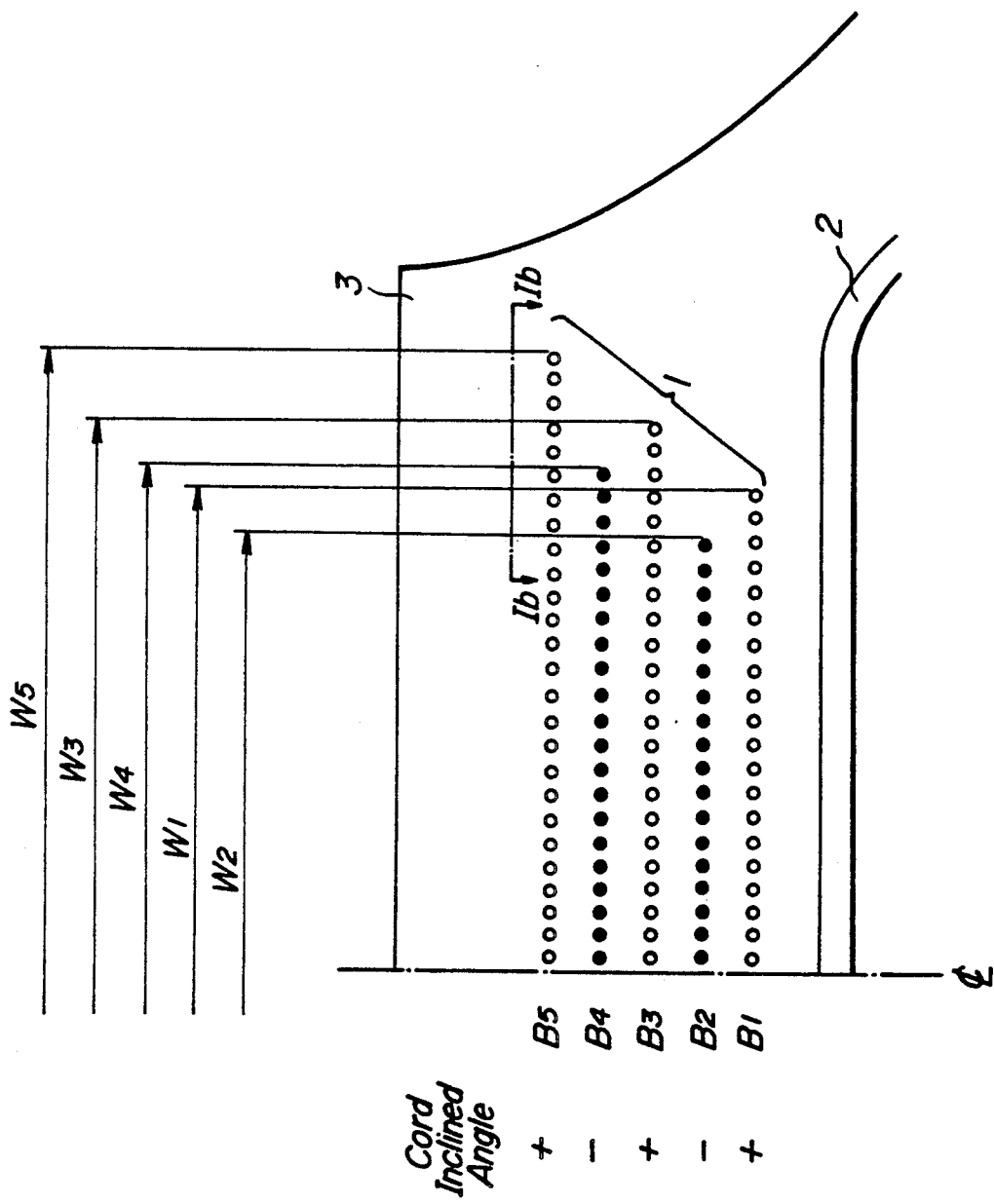

FIG. 1a illustrates in section a tread of a high durable pneumatic radial tire according to the invention. The tread 3 includes reinforcing belt 1 and a radial carcass 2. The belts 1 surround a crown zone of the carcass 2 and are five layers as designated by cord layers $B_1$, $B_2$, $B_3$, $B_4$ and $B_5$ numbered from the nearest to the carcass 2 to the farthest. Widths of the belt layers are also shown by $W_1$, $W_2$, $W_3$, $W_4$ and $W_5$ suffixed with the same corresponding numbers.

Figure 1B:
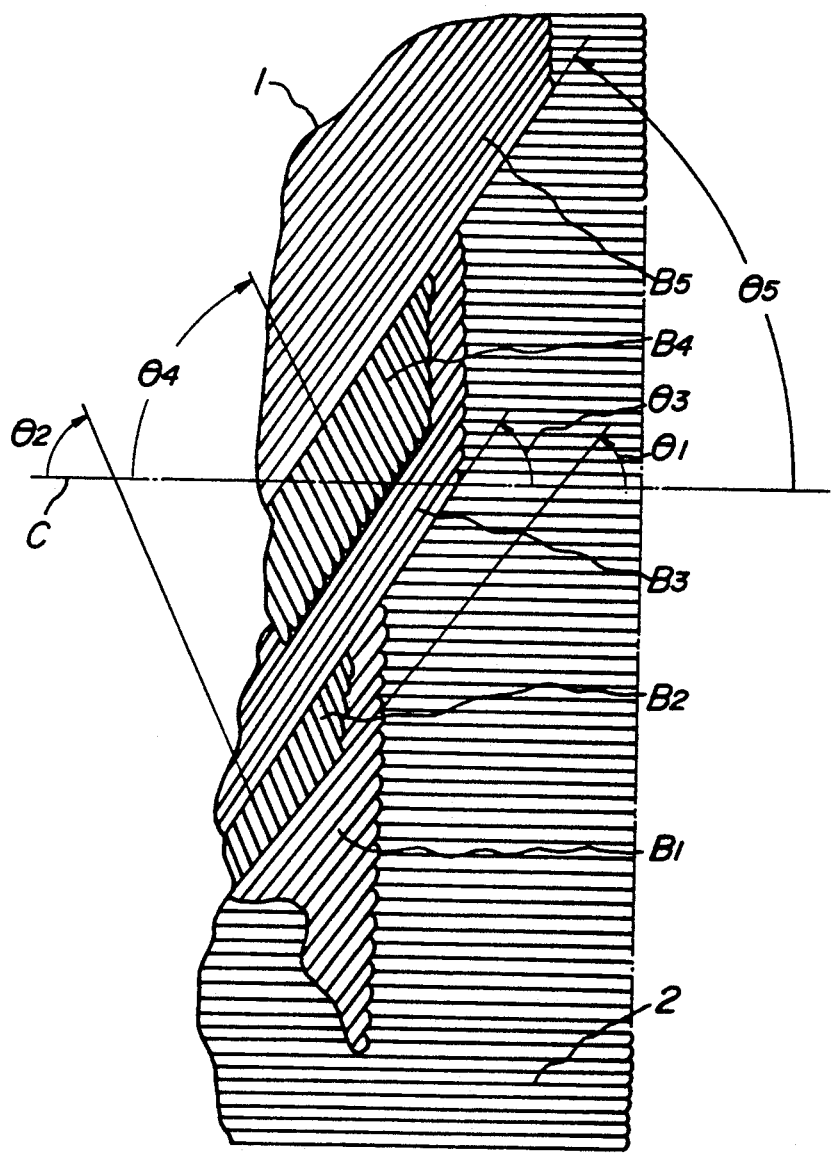

As shown in the partial sectional perspective view of FIG. 1b taken along the line Ib—Ib in FIG. 1a, cord layers $B_1$, $B_3$ and $B_5$ have positive (+) inclined angles $\theta$ relative to a rotating axis of the tire. On the other hand, cord layers $B_2$ and $B_4$ have negative (−) inclined angles $\theta$. The cord layers $B_1$, $B_3$ and $B_5$ having the positive inclined angles and the cord layers $B_2$ and $B_4$ having the negative inclined angles form respective groups. In each group, the cord layer arranged radially outward in the tread is wider in width than those arranged radially inward in the tread. The maximum width $W_4$ of the cord layers having the negative inclined angles is much narrower than the maximum width $W_5$ of the cord layers having the positive inclined angles.

Therefore, the cord layers $B_5$, $B_3$ and $B_1$ in contact with the tread rubber 3 are adjacent each other and have the same positive inclined angles and further embrace the rubber interposed between these cord layers in the proximity of side ends of the cord layers.

In this case, the cord layers $B_2$ and $B_4$ are positioned between the cord layers $B_1$ and $B_3$ and between the cord layers $B_3$ and $B_5$, respectively.

The function of the cord layers will be explained. As above described, the cord layers are divided into two groups having the positive and negative inclined angles of the cords, respectively. The maximum width of one group is very different from the maximum width of the other group. Further, in both the groups, the radially inner cord layers are narrower in width than the radially outer cord layers. The radial inner cord layers are arranged in zones where deformations when loaded are larger. Therefore, strains at ends of the belts in the radially inner zones are reduced, where shearing strains are usually large. Further, as circumferential displacements at side ends of the cord layers of the group having the narrower width when loaded are inherently small, strains of such cord layers at width ends are small.

With the cord layers of the group having the wider width, circumferential displacements of the cord layers at side ends when loaded are large. However, the cord layers except the outermost cord layer have on their outer side the wider cord layer having the same inclined angle, so that the interposed rubber at side ends of the inner cord layer is deformed following to the deformation of the outer cord layer in directions the same as those of the deformation of the outer cord layer.

As a result, relative displacements between the side ends of the cord layers and the rubber interposed in the proximity thereof are decreased so that the shearing strains occurring in the interposed rubber is considerably decreased. This occurs only insofar the side ends of the cord layers are covered on their outsides by the cord layers which are wider and have the same inclined angles.

Moreover, with the outermost cord layers, deformations when loaded are small so that no separations occur because the outermost cord layers are arranged radially outermost.

Accordingly, with this construction of the belt layers, any increase in shearing strain at the side ends of the belt layers is very small even if the cord inclined angles of the cord layers are made small in order to effectively restrain the diameter enlargement.

In applying the present invention to heavy duty pneumatic radial tires for large type construction vehicles, it is preferable that ratio of widths $W_4/W_2$, $W_5/W_3$, or $W_3/W_1$ between the cord layers having the same cord inclined angles, or between $B_4$ and $B_2$, $B_5$ and $B_3$, or $B_3$ and $B_1$ is less than 1.3. If the ratio is more than 1.3, the shearing strains at side ends of the outer cord layer are in excess of a limit value L (FIG. 2).

Moreover, it is also preferable that a ratio of width $W_4/W_5$, or $W_2/W_3$ between the cord layers $B_5$ and $B_4$, or $B_3$ and $B_2$ is more than 0.7. If the ratio is less than 0.7, the effect of the cord layers for supporting tensions becomes small so that diameter enlargement is increased.

EXAMPLE

Figure 4A:
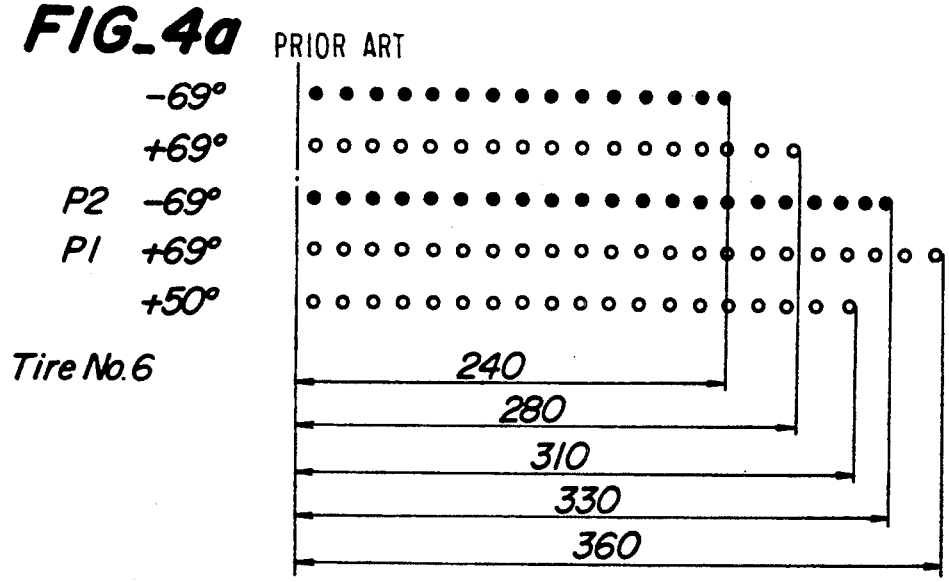
FIG. 4a is a schematic view illustrating a conventional cord layer arrangement in an ultralarge tire.
Figure 4B:
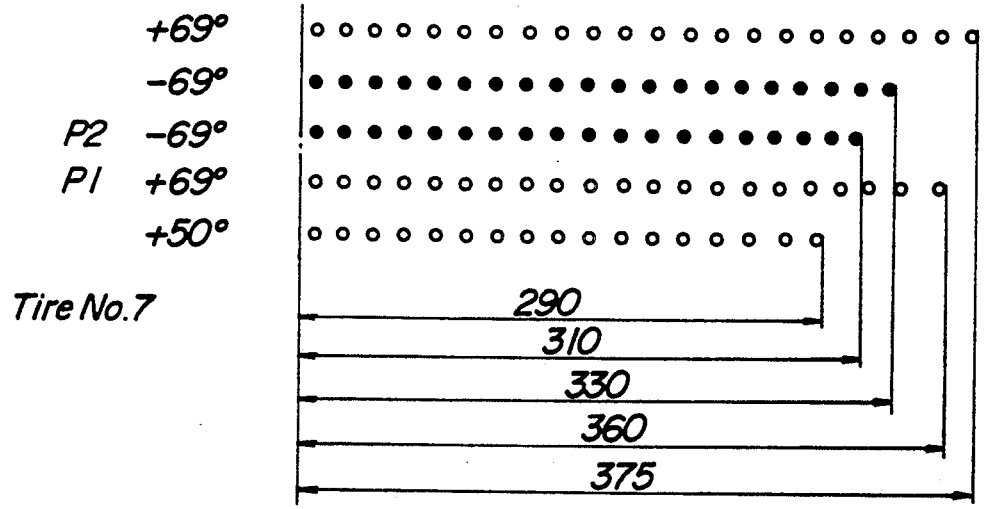
FIGS. 4b and 4c are schematic views illustrating cord layer arrangements of ultralarge type tires according to the invention.
Figure 4C:
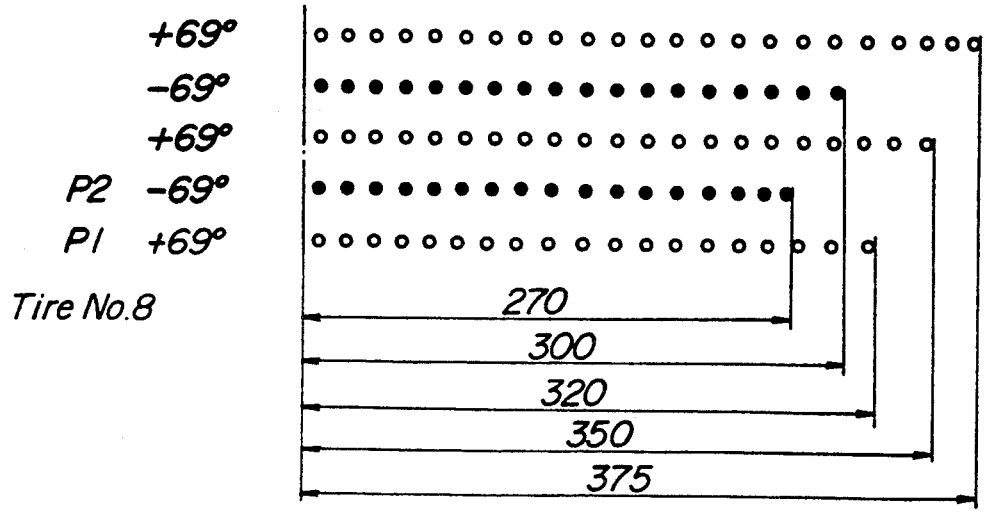

FIG. 3a schematically illustrates a conventional arrangement of four cord layers of a large tire (Tire No. 1 of TBR 10.00 R 20), and FIGS. 3b, 3c, 3d and 3e illustrate arrangements of four cord layers of large tires (Tires Nos. 2, 3, 4 and 5 of TBR 10.00 R 20). FIGS. 4a, 4b and 4c illustrate arrangements of five cord layers of ultralarge tires (Tires Nos. 6, 7 and 8 of ORR 36.00 R 51).

Following drum tests were carried out on these tires wherein the tire was urged against a drum and the drum was rotated to rotatively drive the tire.

TABLE 1

| | Test conditions | | | |
|---|---|---|---|---|
| Tire | Diameter of drum (m) | Load (kg) | Inner pressure (kg/cm$^2$) | Speed (km/h) |
| TBR | 1.7 | 4,050 | 7.25 | 60 |
| ORR | 5.0 | 67,500 | 7.00 | 8 |

Notes: Load is 150% of the load of JATMA (Standard of Japanese Automobile Tire Manufacturer Association). Inner pressure is the standard inner pressure.

First, circumferential shearing strains were obtained by simulation calculation according to the finite-element method.

Testing loads were flatly applied onto the respective tires. In other words, the tires were loaded by urging the tires against a flat anvil by load. Results of the calculation are shown as follows.

Moreover, it is assumed that with the large type tires, the shearing strains 39% at side ends of the cord layer $P_1$ supporting the tensions of the tire No. 1 is the index 100, and with the ultralarge tires, the shearing strains 45% at side ends of the cord layer $P_1$ supporting the tensions of the tire No. 6 is the index 100. The shearing strains of the other tires are shown by index number relative to the indexes. In the drum tests, with the large and ultralarge tires, the tires Nos. 1 and 6 having the conventional constructions first became out of order. Running distances of the tires Nos. 1 and 6 when the troubles occurred were 21,000 km and 6,160 km respectively. The running distances are assumed as index 100. Diameter enlargements of the tires Nos. 1 and 6 when filled with the inner pressure were 1.8 mm and 10.1 mm at center portions, respectively. The diameter enlargements are assumed as index 100.

TABLE 2

| No. | $P_1$ | $P_2$ | Running distance until fault | Diameter enlargement |
|---|---|---|---|---|
| 1 | 100 | 88 | 100 | 100 |
| 2 | 98 | 83 | 101 | 98 |
| 3 | 75 | 86 | 109 | 94 |
| 4 | 78 | 82 | 120 | 94 |
| 5 | 80 | 73 | 128 | 94 |
| 6 | 100 | 85 | 100 | 100 |
| 7 | 75 | 80 | 138 | 95 |
| 8 | 70 | 77 | 152 | 87 |

It is clear that both the diameter enlargement and durability are improved according to the invention.

As can be seen from the above explanation, the invention can solve the problems of diameter enlargement and the separation-resistance for large tires as well as ultralarge tires. It has been thought that these problems are difficult to be simultaneously solved. The durability of tires of these kinds can be improved.

It is further understood by those skilled in the art that the foregoing description is that of preferred embodiments of the disclosed tires and that various changes and modifications may be made in the invention without departing from the spirit and scope thereof.

What is claimed is:

1. A high durability pneumatic radial tire comprising; a tread; a radial carcass; at least four reinforcing belts, each of said belts having a cord layer with cords arranged in parallel with each other and coated with rubber, said cord layers being laminated about a crown region of said radial carcass with the cords intersecting with each other over a crown circumference to reinforce said tread, all of said cord layers divided into two groups by positive and negative signs respectively of projections of the cords of the respective cord layers onto an imaginary coordinate plane including a rotating axis of the tire with cords of said cord layers in one group crossing with cords of the cord layers of said other group and cord layers of one group alternate with cord layers of the other group, the cord layers in each of the groups being progressively wider as said cord layer of a group is arranged radially outward and, a maximum width of the cord layers of the one group being less than a maximum width of the cord layers of the other group, thereby reducing shearing strains caused by a load acting upon the tire in rubbers between said cord layers near to side ends of the cord layers in contact with a tread rubber on the reinforcing belts.

2. A tire as set forth in claim 1, wherein a ratio of a width of a wider cord layer to a width of a narrower cord layer adjacent to said wider cord layer of each group is less than 1.3.

3. A tire as set forth in claim 1, wherein a ratio of the maximum widths of respective cord layers of the groups including wider and narrower cord layers, respectively, is within 0.7–0.9.

4. A tire as set forth in claim 1, wherein the cord layers of each of the groups have larger inclined cord angles measured with respect to said rotating axis of the tire as said cord layers are arranged on further radially outward.

5. A tire as set forth in claim 1, wherein the cords of the cord layers have a physical property of breaking elongation less than 3.5%.

6. A tire as set forth in claim 1, wherein a maximum width of the cord layers of the one group is less than a minimum width of the cord layers of the other group.

* * * * *